US012391564B2

(12) United States Patent
Lockie et al.

(10) Patent No.: US 12,391,564 B2
(45) Date of Patent: Aug. 19, 2025

(54) PROCESS FOR PURIFYING POTASSIUM CHLORIDE

(71) Applicant: Klinge Chemicals Limited, Glasgow (GB)

(72) Inventors: Steve Lockie, Glasgow (GB); Douglas H. Brown, Glasgow (GB)

(73) Assignee: KLINGE CHEMICALS LIMITED, Glasgow (GB)

( * ) Notice: Subject to any disclaimer, the term of this patent is extended or adjusted under 35 U.S.C. 154(b) by 727 days.

(21) Appl. No.: 17/597,690

(22) PCT Filed: Jul. 14, 2020

(86) PCT No.: PCT/GB2020/051691
§ 371 (c)(1),
(2) Date: Jan. 18, 2022

(87) PCT Pub. No.: WO2021/009503
PCT Pub. Date: Jan. 21, 2021

(65) Prior Publication Data
US 2022/0259058 A1    Aug. 18, 2022

(30) Foreign Application Priority Data

Jul. 15, 2019    (GB) .................. 1910137.7

(51) Int. Cl.
*C01D 3/14*    (2006.01)
*B01J 45/00*    (2006.01)
*B01J 47/02*    (2017.01)
*C01D 3/06*    (2006.01)
*C01D 3/16*    (2006.01)

(52) U.S. Cl.
CPC .............. *C01D 3/145* (2013.01); *B01J 45/00* (2013.01); *B01J 47/02* (2013.01); *C01D 3/06* (2013.01); *C01D 3/16* (2013.01); *C01P 2006/80* (2013.01)

(58) Field of Classification Search
CPC ... C01D 3/145; C01D 3/16; C01D 3/06; B01J 45/00; B01J 47/02; C01P 2006/80
See application file for complete search history.

(56) References Cited

U.S. PATENT DOCUMENTS

| 4,123,260 A | 10/1978 | Sefton et al. |
| 4,261,803 A * | 4/1981 | Suhara .................. C01D 3/145 205/512 |
| 4,423,159 A | 12/1983 | Ebra et al. |
| 4,830,837 A | 5/1989 | Justice et al. |

(Continued)

FOREIGN PATENT DOCUMENTS

| CN | 101045565 A | 10/2007 |
| CN | 101049984 A | 10/2007 |

(Continued)

Primary Examiner — Richard M Rump
(74) Attorney, Agent, or Firm — FOX ROTHSCHILD LLP

(57) ABSTRACT

A process for the preparation of purified potassium chloride comprises the at least partial removal of one or more class 1 heavy metal impurity (lead, arsenic, cadmium and/or mercury) from potassium chloride process liquor by an ion exchange step. The process uses an ion exchange resin and achieves high levels of purity and is compatible with high flow rates. A recrystallisation step (e.g. a cooling crystallization step) may be employed subsequent to the ion exchange step.

16 Claims, 3 Drawing Sheets

(56) References Cited

U.S. PATENT DOCUMENTS

| | | | |
|---|---|---|---|
| 5,238,663 A | 8/1993 | Vikari et al. | |
| 2002/0015676 A1 | 2/2002 | Tanaka et al. | |
| 2012/0318743 A1 | 12/2012 | Van Niekerk | |
| 2013/0104700 A1 | 5/2013 | Gisch et al. | |
| 2014/0308182 A1 | 10/2014 | Weissenbaeck et al. | |
| 2017/0306440 A1 | 10/2017 | Hein et al. | |

FOREIGN PATENT DOCUMENTS

| | | | | |
|---|---|---|---|---|
| CN | 101049994 A | | 10/2007 | |
| CN | 104291360 A | | 1/2015 | |
| CN | 106495189 A | * | 3/2017 | |
| CN | 108689539 A | * | 10/2018 | |
| EP | 0236066 A2 | | 9/1987 | |
| FR | 2353490 A1 | | 12/1977 | |
| GB | 402770 A | | 12/1933 | |
| GB | 872985 A | | 7/1961 | |
| GB | 1491399 A | | 11/1977 | |
| JP | S5358995 A | | 5/1978 | |
| JP | S6191014 A | | 5/1986 | |
| JP | 2001026418 A | | 1/2001 | |
| JP | 2006035027 A | | 2/2006 | |
| JP | 2016150898 A | | 8/2016 | |
| JP | 2017210675 A | | 11/2017 | |
| KR | 200211618 Y1 | | 1/2001 | |
| WO | WO-2014172032 A2 | * | 10/2014 | ................ C02F 1/42 |

* cited by examiner

PROCESS FOR PURIFYING POTASSIUM CHLORIDE

The present invention relates to the production of potassium chloride.

Potassium chloride has uses in the medical, chemical, agricultural, engineering and food industries. Some of these require high levels of purity.

It is becoming more important to ensure that heavy metal impurities are controlled in numerous drug products, because of the harmful effects of such impurities and because consumers and regulatory requirements demand higher standards and greater purity. In 2010, United States Pharmacopoeia (USP) announced that three new general chapters on elemental impurities, methods and dietary supplements would be created. The International Council for Harmonisation also announced similar measures with the ICH Q3D Guideline on Elemental Impurities. The guidelines became requirements from January 2018. Compliance with new, stricter standards is highly desirable and commercially important or in some cases essential.

From a first aspect the present invention provides a process for the preparation of purified potassium chloride comprising the removal of one or more class 1 heavy metal impurity (lead, arsenic, cadmium and/or mercury) from potassium chloride process liquor by an ion exchange step.

The process for the preparation of purified potassium chloride may comprise:
(i) providing potash;
(ii) subjecting the potash to a dissolution step by adding water;
(iii) optionally carrying out washing and/or filtration to remove some impurity(ies);
(iv) removal of one or more class 1 heavy metal impurity (lead, arsenic, cadmium and/or mercury) by an ion exchange process;
(v) optionally carrying out one or more further steps selected from further filtration, recrystallization, centrifuging, drying, sieving and packaging.

The ion exchange process utilises an ion exchange resin to remove or reduce the amount of class 1 impurities thereby purifying the potassium chloride. The removal may be at least partial removal, or removal of a substantial or significant part, or substantially complete removal.

These impurities are referred to in some documents as elemental impurities, despite the fact that they may be present not as elements but as compounds (for example a lead impurity may be present not as zero-valent elemental lead but rather as lead bound to other atoms, including in compounds such as lead chloride and other salts of lead, such that the impurity can be considered to be in the form of lead ions).

We have been manufacturing potassium chloride from potash (the raw material from which potassium chloride is extracted) for many years, and prior to the present invention have not used an ion exchange step. Conventionally, other methods of purification have been used.

We have now found that including an ion exchange step makes the process more effective.

Depending on the source of the potash, significant levels of class 1 heavy metals can be present therein, and conventionally the removal of these has been difficult and costly. Measurable levels of lead may be present. Arsenic, cadmium and mercury may be less detectable in the raw material but may still be present at levels which can be problematic for some applications. The present invention provides an improved and more economical method for purification.

We are not aware of ion exchange methodology having been used in this context before.

Ion exchange methodology is commonly used for the purification or cleaning of liquids such as water at or near ambient conditions, for example the purification or softening of water or the treatment of wastewater. They have conventionally also been used in other processes, one further example being biodiesel filtration. In the present invention, an ion exchange resin is used to remove heavy metal ions from a hot saline solution.

When we were considering how to solve the problem of impurities such as lead being present in potassium chloride, it was not at all obvious to us that ion exchange methodology would be suitable. The flow rates of the process liquor are typically very high (around 200 litres per minute) so the resin has a limited time to remove ions. The process liquor itself is saturated with potassium and chloride ions, which we expected would have complicated the ion exchange process. We were also aware of the possibility of potassium chloride crystallising out earlier than intended (i.e. within the ion exchange vessels), and connected with this we put the liquor through the resin at very high temperatures compared to standard ambient ion exchange applications, which might have been expected to have undesirable consequences, for example in challenging the capabilities of resins and/or vessels. Traditional ion exchange processes are very benign in comparison.

Nevertheless, despite these anticipated difficulties, we have found that ion exchange methods work very well and are surprisingly effective in removing lead and other similar impurities from potassium chloride.

One reason for the present invention being particularly useful is that we have found that lead and other similar impurities cannot easily be "washed out" in the same way as other impurities (e.g. sodium, magnesium and calcium materials). Such other impurities can often be removed at a recrystallisation stage whereas the present invention focuses on removing class 1 heavy metal impurities prior to crystallisation i.e. from the process liquor.

It might have been expected that lead could be removed due to the differential solubility of lead compounds, but we have found this not to be the case. In fact, we have found that some conventional potassium chloride purification processes actually concentrate the lead level in the final product. Without wishing to be bound by theory, we believe that this could be due to the behaviour of lead impurities during crystallization steps: lead ions may act as seeds that the potassium crystals form round. Therefore it is useful to remove lead prior to any crystallisation step.

A further advantage of the present invention is that, if crystallisation is carried out as part of the process, said crystallisation can be a cooling crystallisation step, rather than an evaporative crystallisation step. Evaporative crystallisation is commonly used for potassium chloride purification, and trials we have performed have shown that class 1 heavy metals (e.g. lead impurities) can be removed during such evaporative crystallisation—without wishing to be bound by theory this may be because crystallisation is "forced" and occurs before the lead ions can be captured within the potassium chloride crystals. Such a process is however not as effective as removal of class 1 heavy metals (e.g. lead impurities) by ion exchange. Following ion exchange, crystallisation can be carried out by a cooling crystallisation process rather than an evaporative crystallisation process. We have found that this enables us to better control the crystal particle sizes in the product. We can generate a wider range of crystal particle sizes compared to the evaporative crystallisation process. This allows the optimisation of production output. Importantly it allows us to achieve some very specific, and demanding, particle size distributions that customers require for particular applications, e.g. for pharmaceutical uses, e.g. in order to achieve particular timed release profiles of drug formulations.

The particle size distributions produced may be varied according to particular requirements. These may be measured by a sieve analysis. Optionally, at least 90% by weight of the product may be particles with the size range 100 to 1,000 microns. Optionally this may be at least 95% or at least 99%. For some applications, at least 90% or at least 95% or at least 99% by weight of the product may have a particle size of less than or equal to 1,000 microns. For some applications, at least 90% or at least 95% or at least 99% by weight of the product may have a particle size of between 100 and 250 microns. For some applications, at least 90% or at least 95% or at least 99% by weight of the product may have a particle size of between 180 and 500 microns. For some applications, at least 90% or at least 95% or at least 99% by weight of the product may have a particle size of between 300 and 600 microns. For some applications, at least 90% or at least 95% or at least 99% by weight of the product may have a particle size of between 230 and 350 microns. For some applications, at least 90% or at least 95% or at least 99% by weight of the product may have a particle size of between 500 and 850 microns. For some applications, at least 90% or at least 95% or at least 99% by weight of the product may have a particle size of between 850 and 1000 microns. For some applications, at least 90% or at least 95% or at least 99% by weight of the product may have a particle size of between 600 and 940 microns.

The ion-exchange resin may be an insoluble matrix. It may comprise beads. The beads, or a significant proportion of them, e.g. at least 50% by weight or at least 75% or at least 90%, may have diameters between 0.3 mm and 2 mm, e.g. between 0.5 mm and 1 mm. The beads may be porous, thereby providing a high surface area. The ion exchange resin may be a microporous resin. The trapping of ions occurs with concomitant releasing of other ions. The ion exchange resin may be a cation exchange resin, for example a microporous cation exchange resin.

Suitable ion exchange resins include chelating resins. These bind metal ions by chelating to them. They may be multidentate, for example bidentate. The chelating resin may bind bivalent cations which form is often taken by the class 1 elemental impurities. The chelating resin may comprise chelating agents in a polymer matrix. The chelating resin may comprise chelating agents pendant from a polymer backbone.

Optionally the ion exchange resin may be one which releases sodium ions in order to trap heavy metal ions. This exchange will only be effective for as long as there are sodium ions present for exchange. Once exhausted, the resin has to be regenerated.

The apparatus may therefore be compatible with the regeneration of the resin at particular intervals, for example at the end of a working week. Regeneration of the ion exchange resin may be carried out without contamination of process liquor with regeneration chemicals.

The donation of sodium ions into the process liquor from the resin will not have any problematic impact on the sodium content of the finished product as the maximum sodium contribution from the resin would typically be less than 5 ppm, which is of no concern as even commercially available potassium chloride which is classified as very pure may contain sodium levels in the product of around 200-500 ppm. A 5 ppm sodium donation would be less than the typical analytical variation observed using iCAP determination.

One method of regeneration entails the addition of acid (for example hydrochloric acid) to flush any metal cations from the resin receptor sites, exchanging these with hydrogen ions, then flushing with a sodium compound (for example sodium hydroxide) to convert the (unstable) hydrogen form resin to the stable sodium form. Finally water may be used to flush out the regeneration chemicals and return the resin to a "ready state".

Other ions may be used instead of sodium ions (for example, potassium ions). Other bases may be used (for example potassium hydroxide) instead of sodium hydroxide. Other acids (for example sulphuric acid) could be used instead of hydrochloric acid. Nevertheless, sodium hydroxide and hydrochloric acid are perhaps the most readily available and cost effective in the quantities required.

The ion exchange resin used may be an iminodiacetic acid chelating cation exchange resin. We have found these to be particularly effective; they have high selectivity for bivalent metal ions and can operate in concentrated brine.

The ion exchange resin used in the present invention may be Amberlite IRC748

The Amberlite IRC748 resin donates sodium ions in order to trap heavy metal ions.

The process of the present invention generally results in a product having lead impurity levels of no greater than 0.5 ppm, often no greater than 0.2 ppm, or in some cases no greater than 0.1 ppm or even no greater than 0.05 ppm, or no greater than 0.005 ppm. Nevertheless, in some cases and for some applications different levels of lead impurity may be acceptable and the process can be used accordingly, for example to give a product having lead impurity levels of no greater than 5 ppm, or no greater than 1 ppm, for example.

Similarly, products having low levels of cadmium, mercury and/or arsenic are achieved using the process of the present invention. In general, even lower amounts of these impurities (for example, no greater than 0.1 ppm, or no greater than 0.05 ppm, or no greater than 0.005 ppm) may typically be present after the process of the present invention. This may in part be due to the starting material typically containing lower amounts of these materials.

The process of the present invention generally results in a product having arsenic impurity levels of no greater than 0.5 ppm, often no greater than 0.2 ppm, or in some cases no greater than 0.1 ppm or even no greater than 0.05 ppm, or no greater than 0.005 ppm. Nevertheless, in some cases and for some applications different levels of arsenic impurity may be acceptable and the process can be used accordingly, for example to give a product having arsenic impurity levels of no greater than 5 ppm, or no greater than 1 ppm, for example.

The process of the present invention generally results in a product having cadmium impurity levels of no greater than 0.5 ppm, often no greater than 0.2 ppm, or in some cases no greater than 0.1 ppm or even no greater than 0.05 ppm, or no greater than 0.005 ppm. Nevertheless, in some cases and for some applications different levels of cadmium impurity may be acceptable and the process can be used accordingly, for example to give a product having cadmium impurity levels of no greater than 5 ppm, or no greater than 1 ppm, for example.

The process of the present invention generally results in a product having mercury impurity levels of no greater than 0.5 ppm, often no greater than 0.2 ppm, or in some cases no greater than 0.1 ppm or even no greater than 0.05 ppm, or no greater than 0.005 ppm. Nevertheless, in some cases and for some applications different levels of mercury impurity may be acceptable and the process can be used accordingly, for example to give a product having mercury impurity levels of no greater than 5 ppm, or no greater than 1 ppm, for example.

Analytical limitations result in difficulties in detecting amounts less than 0.1 ppm. In some cases it is possible to detect amounts down to <0.05 ppm or <0.005 ppm for all elements.

The ion exchange system of the present invention is capable of operating in a cGMP environment. The ion exchange resin is capable of reducing the level of lead and/or other class 1 elements (mercury, cadmium and arsenic) to desired pharmacopoeial or customer specific limits.

The present invention is suitable for operation in the context of a controlled, validated production environment. The purified potassium chloride may be sold as an active pharmaceutical ingredient (API). For such uses, all items of equipment, and processes used in the manufacture, have to demonstrate a stable quality of final product at maximum and minimum operating ranges, be certified to the appropriate pharmacopoeia for the end market, and pose no risk to the patient, particularly if supplied for use in injectable (parenteral) products such as IV solutions.

The ion exchange resin is effective on hot potassium chloride solution. This may be at a temperature of about 60 to 90 degrees C., optionally 70 to 80° C.

The potassium chloride solution may be saturated.

The system (incorporating the resin) is compatible with process flow rates suitable for the manufacture of potassium chloride. Optionally the flow rate may be between 50 l/min and 300 l/min, e.g. between 100 l/min and 250 l/min, e.g. between 150 l/min and 250 l/min. One typical range for flow rates during production is 180-220 l/min Optionally, as well as the at least partial removal of one or more class 1 heavy metal impurity (lead, arsenic, cadmium and/or mercury), the process and apparatus may also remove (e.g. at least partially) one or more other metal impurity, for example one or more of vanadium, thallium, cobalt, nickel, zinc, manganese, copper and/or iron impurity. These metal impurities may be, in particular, vanadium or thallium. For example, the process and apparatus may at least partially remove: lead and thallium; or lead and arsenic; or lead and vanadium; or lead and cadmium; or mercury and cadmium; or lead and cadmium and vanadium; or lead and arsenic and thallium.

These additional metal impurities may optionally be removed by the same ion exchange resin used to remove the class 1 heavy metal impurity/ies, and/or may optionally be removed by a different ion exchange resin.

It may be that removal of each of these metal impurities may achieve impurity levels of no greater than 0.5 ppm, often no greater than 0.2 ppm, or in some cases no greater than 0.1 ppm or even no greater than 0.05 ppm, or no greater than 0.005 ppm.

So that the above-recited features of the present invention can be understood in further detail, and by way of non-limiting examples, the appended drawings are provided, in which.

Figure 1:
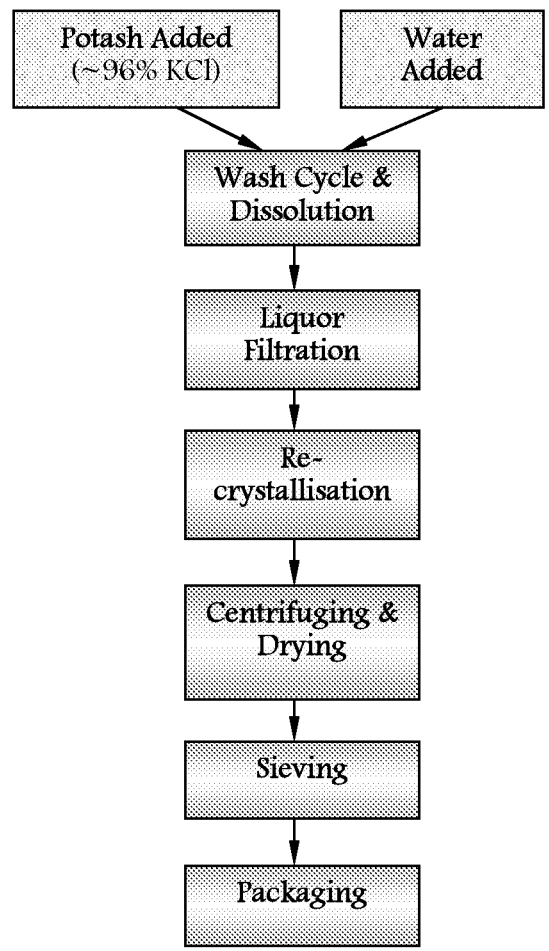
FIG. 1 shows a series of steps used in a process flow for the preparation of a potassium chloride product prior to the present invention.

With reference to FIG. 1, a process for the preparation of potassium chloride can comprise the surface washing of potash, dissolution and filtration.

The ion exchange process equipment of the present invention can link in to the process in the early stages of manufacturing, which is essentially raw material preparation.

The ion exchange process step can optionally fit in between dissolution and filtration.

According to one method carried out previously, process liquor has been transferred from a dissolving tank to a pre-filtration holding tank, then through multi stage filtration (for example, a three stage filtration or a two-stage filtration).

Figure 2:
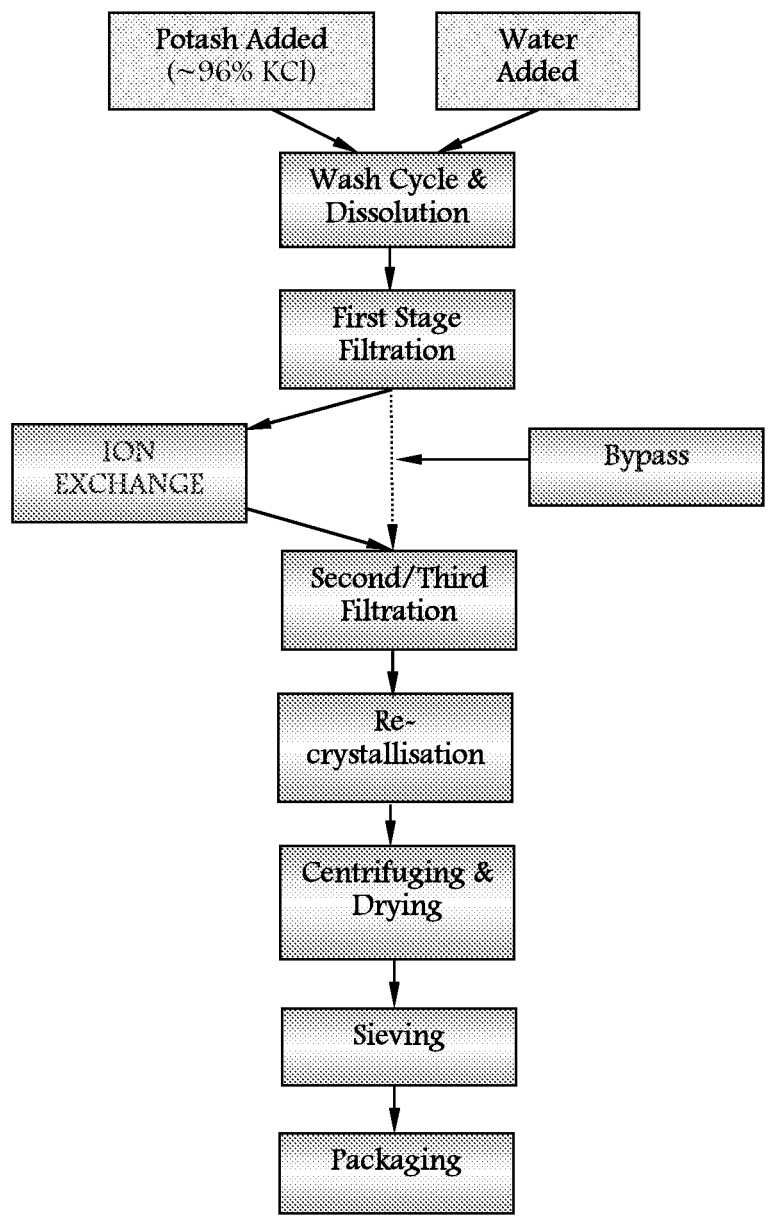
FIG. 2 shows a series of steps used in a process flow for the preparation of a potassium chloride product according to one embodiment of the present invention.

With reference to FIG. 2, in one embodiment of the present invention, the process involves the process liquor being pumped from a pre-filtration holding tank, through a first filtration step (e.g. 10 micron), onto an ion exchange system, before completing the second and third filtration steps (e.g. 10 and 6 micron). The process has also recently been validated to run with a two stage filtration—10 and 0.6 micron.

The process liquor is pumped through the first filtration stage prior to ion exchange as this first filtration stage captures virtually all of the insoluble impurities. These insolubles may have a negative effect on the ion exchange resin if they are not removed.

One advantage of the ion exchange system of the present invention is that it may be completely independent from the existing process, which means that no modifications are necessary beyond connecting the inlet and outlet pipework. This option to "bypass" ion exchange means that the process can operate in a conventional manner for circumstances when ion exchange is not required (e.g. weekly run-down when the liquor is heated above the maximum operating temperature of the resin, following a specific customer request, or when unnecessary due to the characteristics of the potash).

The process liquor enters the ion exchange equipment following the first filtration stage. Temperature and flow rate are monitored through the system to ensure they are consistent with established process parameters.

Ion exchange pipework and resin vessel linings are constructed from PVdF material which is approved for use in the pharmaceutical industry. Vessel and pipework sizing are been selected to ensure that process flow-rates can be maintained with minimal or acceptable pressure drop.

Figure 3:
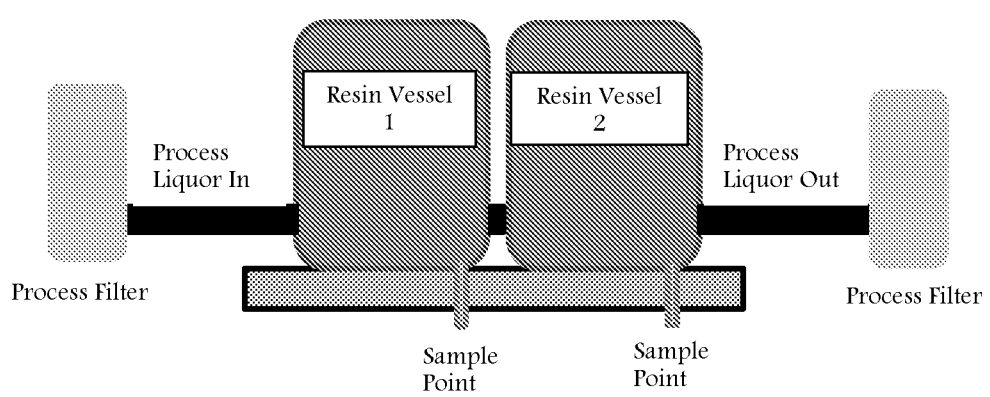
FIG. 3 shows how ion exchange resin vessels can be incorporated into existing apparatus for the preparation of potassium chloride.

With reference to FIG. 3, several, e.g. two, resin vessels may used, to cater for regeneration not being carried out until the end of a usage cycle, e.g. a production week. The first resin vessel may be designed to remove all the lead (and/or other heavy metal impurity) from the process liquor. The second vessel may act as a policing (or polishing) unit which will catch any "slippage" from the first vessel should that start to become exhausted.

Regeneration is carried out as required. We have found that due to the lead helping form the crystal, analysis of the liquor from the skid gives a result which needs adjusting before providing a reliable indication of when the resin is approaching exhaustion. It is therefore recommended to analyse lead levels daily on finished product. In some embodiments it is appropriate to regenerate the first vessel approximately every week, with the second one regenerated every 2-3 (usually 3) regeneration cycles. This may established by internal monitoring. Regeneration may be controlled/monitored by a programmable logical controller (PLC) (or other method suitably robust for operation in the manufacturing environment) and in-line pH and conductivity probes.

The ion exchange equipment may be installed next to existing apparatus, if necessary by expansion of existing buildings or addition of lean-to buildings. Additional process pipework may be installed to accommodate process liquor flow through the ion exchange plant.

Optionally a process liquor pump may be used which is of sufficient capacity to move liquor through the ion exchange plant and back into existing process whilst maintaining acceptable flow-rates.

A process water supply may be installed for purging of ion exchange vessels following re-generation (resin backwash).

A process water supply may be installed for the cleaning of ion exchange pipes and valves.

A process water supply may be used as a safety flush to protect the resin should flow of process liquor be interrupted for any reason (e.g. breakdown elsewhere in the process).

A bypass system may be present so that the process can be operated in a conventional manner if/when required. This entails routing the process liquor through conventional apparatus, avoiding the ion exchange part of the process.

An effluent tank and/or treatment system may be utilised for safe disposal of waste.

The lead removal performance (or other heavy metal removal performance) may be monitored by routine sampling of the process by analysis of final product. A sample from an inter stage sample point may be analysed for lead regularly, e.g. daily. On detection of lead levels greater than a particular threshold (e.g. 0.5 ppm) a regeneration of a first ion exchange resin vessel may be scheduled. A second ion exchange resin vessel may be used as a policing unit to ensure that when this occurs, any residual lead is captured in the second vessel and no lead passes to the product.

The final product is analysed daily for lead content (for example), and certified for release to the customer where the levels are below the specified requirement. All analysis data is trended to monitor lead levels (or other group 1 levels(. This data may be used in confirming appropriate re-generation intervals.

In some embodiments, the analytical requirements may be as follows.

Analytical Requirements
EP Monograph
  Acid/Alkalinity: <0.5 ml 0.01N NaOH, <0.5 ml 0.01N HCl.
  Assay: 99.0-101.0% (on dried material)
  Appearance: Clear & Colourless
  Barium: Complies with Specification
  Bromide: <1000 ppm
  Calcium/Magnesium: <200 ppm (as Calcium)
  Heavy Metals: <10 ppm (as Lead)
  Iodide: Complies with Specification
  Iron: <20 ppm
  Solubility: Freely soluble in water, practically insoluble in ethanol.
  Sulphates: <300 ppm
  Loss on Drying: <1.0%
USP Monograph
  Acid/Alkalinity: No pink colour after addition of 0.3 ml 0.2M NaOH
  KCl Assay: 99.0-100.5% on dried material
  Bromide: Brown colour of chloroform layer less than concomitantly prepared standard (Limit 0.1%)
  Calcium/Magnesium: Not detected by prescribed method
  Heavy Metals: <10 ppm (as Lead)
  Iodide: Violet colour of chloroform layer less than concomitantly prepared standard (Limit 0.005%)
  Sodium: No pronounced yellow colour to a non-luminous flame (found figure will be stated)
  Loss on Drying: <1.0% (105° C., 2 hours)
Lead Content
  Lead: <0.1 ppm (Customer specific limit)
Particle Size Analysis
  PSD: Defined on PQ report (varies with Process Parameters used).
Remaining Heavy Metals
  Arsenic: <0.5 ppm (Customer specific limit)
  Mercury: Report
  Cadmium: Report

EXAMPLE

One non-limiting example of a method carried out in accordance with the present invention is as follows. It should be noted that this is merely one embodiment and that the method may be varied. Not all the features specified below are essential features of the invention. Other methods are possible within the scope of the claims.

In a continuous process, 700-850 kg per hour of potash, unrefined potassium chloride, mined from evaporite deposits in Western Canada, was added in a 316L stainless steel vessel to potable water at ambient temperature in order to perform a "surface wash" of the crystals (removal of some surface impurities such as clay, insolubles and sodium chloride). The wash water was then spun away by centrifuge.

The washed potash was then dissolved under heat (70-80° C.) in a 316L stainless steel vessel fitted with a steam heating coil achieving a saturated solution (liquor) containing approx. 50% by weight potassium chloride. This was transferred to a 316L stainless steel holding vessel to allow filtration to be carried out. First stage filtration was carried out using a series of polymer constructed pleated filter cartridges, rated at 10 microns, located in a 316L stainless steel housing. The liquor was continuously pumped through the first stage of filtration and into a first ion exchange vessel, a PVdF (Polyvinylidene fluoride) plastic vessel, containing ion exchange resin Amberlite IRC748 (recently re-branded to AmberSep, obtained from Dow (now owned by DuPont). The first vessel removed the majority of the elemental impurities. The liquor then flowed directly into the second PVdF vessel containing ion exchange resin Amberlite IRC748 which acted as a "polishing" step to remove any elemental impurities that may have passed through the first vessel.

Following ion exchange, the liquor passed an additional filtration step at 10 microns and on to a final filtration step, again with pleated filter cartridges located in a housing, this time rated at 0.6 microns.

Flow-rate through the wash cycle, dissolution, filtration and ion exchange process steps maintained saturation and temperature. This was 200 l/min during normal process operation.

Following the final filtration step, the liquor was transferred to a crystallisation stage. Two crystallisers were utilized, both manufactured using SMO254 stainless steel. These used a combination of cooling, agitation and residence time to develop crystals to the desired size.

Following re-crystallisation, the liquor was a slurry. This was pumped to a 316L stainless steel holding vessel for transfer to the final purification stage, centrifugation. Whilst in the centrifuge, as the (now de-saturated) process liquor was displaced from the solid (cake), pharmaceutical quality purified water was sprayed on to the solid to fine tune the purity of the product and to ensure all process liquor was removed. This de-saturated process liquor was then pumped to the dissolving tank at the start of the process to have more raw material added.

The washed cake was transferred to a fluid bed (natural gas) drier where it was dried for over one hour at 250° C.

The dried product was then transferred to a sieving system where fractions of the material were removed according to the particle size distribution requirements of the customer.

The respective fractions were transferred using vacuum to a controlled environment packing area. Sampling took place at this stage.

The product was analysed to the respective pharmacopoeial standard. It was then analysed to ensure compliance with the customer's particle size distribution requirements. Analysis of elemental impurities, using iCP-MS and iCP-OES was carried out on the finished product sample to ensure customer requirements were met.

The invention claimed is:

1. A process for the preparation of purified potassium chloride comprising the step of at least partially removing one or more class 1 heavy metal impurities selected from the group consisting of lead impurities, arsenic impurities, cadmium impurities and mercury impurities, from potassium chloride process liquor by ion exchange, and the process comprising a recrystallisation step subsequent to the ion exchange, wherein said recrystallisation step is cooling crystallisation.

2. The process as claimed in claim 1 comprising, after the ion exchange, carrying out one or more further steps selected from further filtering, centrifuging, drying, sieving and packaging.

3. The process as claimed in claim 1 comprising preceding steps of: providing potash; subjecting the potash to a dissolution step by adding water; and optionally carrying out washing and/or filtration to remove some impurity or impurities.

4. The process as claimed in claim 1, wherein the ion exchange step is carried out using an ion exchange resin which is a cation exchange resin.

5. The process as claimed in claim 1, wherein the ion exchange step is carried out using an ion exchange resin which is a chelating resin.

6. The process as claimed in claim 5 wherein the ion exchange resin is an iminodiacetic acid chelating cation exchange resin.

7. The process as claimed in claim 1, wherein the purified potassium chloride product has a lead impurity level of no greater than 0.5 ppm.

8. The process as claimed in claim 1, wherein the purified potassium chloride product has a cadmium impurity level, and/or a mercury impurity level, and/or an arsenic impurity level of no greater than 0.1 ppm.

9. The process as claimed in claim 1, wherein the flow rate of the process liquor through an ion exchange resin is between 50 and 300 litres per minute.

10. The process as claimed in claim 1, wherein the temperature of the process liquor flowing through an ion exchange resin is between 60 and 90 degrees C.

11. The process as claimed in claim 1, wherein the ion exchange step is carried out using an ion exchange resin comprising porous beads.

12. The process as claimed in claim 1, wherein the ion exchange step is carried out using an ion exchange resin comprising beads, and wherein at least 50% by weight of the beads have diameters between 0.3 mm and 2 mm.

13. A process for the preparation of purified potassium chloride comprising the step of at least partially removing one or more class 1 heavy metal impurities selected from the group consisting of lead impurities, arsenic impurities, cadmium impurities and mercury impurities, from potassium chloride process liquor by ion exchange, and after the ion exchange, the process comprising a filtration step prior to a recrystallisation step.

14. The process as claimed in claim 13, wherein the filtration step is a two-stage filtration in sequence of: a filtration utilising a filter and a further filtration utilising a further filter, the filter being rated at a larger size than the further filter.

15. A process for the preparation of purified potassium chloride comprising the step of at least partially removing one or more class 1 heavy metal impurities selected from the group consisting of lead impurities, arsenic impurities, cadmium impurities and mercury impurities, from potassium chloride process liquor by ion exchange, and subsequent to the ion exchange, the process comprising a recrystallisation step, wherein after the recrystallisation step, the process comprises centrifuging to displace the process liquor from potassium chloride solid, spraying water onto the solid to tune its purity and to remove the process liquor, and adding more raw material to the process liquor.

16. A process for the preparation of purified potassium chloride comprising the step of at least partially removing one or more class 1 heavy metal impurities selected from the group consisting of lead impurities, arsenic impurities, cadmium impurities and mercury impurities, from potassium chloride process liquor by ion exchange, wherein the ion exchange comprises passing the process liquor through a first ion exchange vessel and then a second ion exchange vessel, both vessels containing ion exchange resin, and wherein the process further comprises regenerating the ion exchange resin in the first ion exchange vessel more frequently than regenerating the ion exchange resin in the second ion exchange vessel.

* * * * *